(12) United States Patent
BahenaTapia et al.

(10) Patent No.: US 11,537,940 B2
(45) Date of Patent: Dec. 27, 2022

(54) SYSTEMS AND METHODS FOR UNSUPERVISED ANOMALY DETECTION USING NON-PARAMETRIC TOLERANCE INTERVALS OVER A SLIDING WINDOW OF T-DIGESTS

(71) Applicant: Oracle International Corporation, Redwood Shores, CA (US)

(72) Inventors: Dario BahenaTapia, Jalisco (MX); Sampanna Shahaji Salunke, Dublin, CA (US); Dustin Garvey, Exeter, NH (US); Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 854 days.

(21) Appl. No.: 16/410,980

(22) Filed: May 13, 2019

(65) Prior Publication Data

US 2020/0364607 A1 Nov. 19, 2020

(51) Int. Cl.
*G06N 20/00* (2019.01)
*G06F 17/18* (2006.01)
(Continued)

(52) U.S. Cl.
CPC ............. *G06N 20/00* (2019.01); *G06F 9/542* (2013.01); *G06F 11/327* (2013.01); *G06F 11/3447* (2013.01); *G06F 17/18* (2013.01)

(58) Field of Classification Search
CPC combination set(s) only.
See application file for complete search history.

(56) References Cited

U.S. PATENT DOCUMENTS 6,298,063 B1  10/2001  Coile et al.
6,438,592 B1   8/2002  Killian
(Continued)

FOREIGN PATENT DOCUMENTS

CN   105426411 A    3/2016
CN   109359763 A    2/2019
(Continued)

OTHER PUBLICATIONS

Faraz Rasheed, "A Framework for Periodic Outlier Pattern Detection in Time-Series Sequences," May 2014, IEEE.
(Continued)

*Primary Examiner* — Tuan C Dao
(74) *Attorney, Agent, or Firm* — Invoke

(57) ABSTRACT

Systems and methods for unsupervised training and evaluation of anomaly detection models are described. In some embodiments, an unsupervised process comprises generating an approximation of a data distribution for a training dataset including varying values for a metric of a computing resource. The process further determines, based on the size of the training dataset, a first quantile probability and a second quantile probability that represent an interval for covering a prescribed proportion of values for the metric within a prescribed confidence level. The process further trains a lower limit of the anomaly detection model using a first quantile that represents the first quantile probability in the approximation of the data distribution and an upper limit using a second quantile that represents the second quantile probability in the approximation. The trained upper and lower limits may be used to monitor input data for anomalous behavior and, if detected, trigger responsive action(s).

20 Claims, 7 Drawing Sheets

(51) Int. Cl.
  *G06F 9/54* (2006.01)
  *G06F 11/32* (2006.01)
  *G06F 11/34* (2006.01)

(56) References Cited

U.S. PATENT DOCUMENTS

| | | |
|---|---|---|
| 6,597,777 B1 | 7/2003 | Ho |
| 6,643,613 B2 | 11/2003 | McGee et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,583,649 B2 | 11/2013 | Ailon et al. |
| 8,635,328 B2 | 1/2014 | Corley et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,053,171 B2 | 6/2015 | Ailon et al. |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,495,395 B2 | 11/2016 | Chan et al. |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,910 B2 | 5/2017 | Poola et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,210,036 B2 | 2/2019 | Iyer et al. |
| 10,331,802 B2 | 6/2019 | Garvey et al. |
| 10,692,255 B2 | 6/2020 | Garvey et al. |
| 10,699,211 B2 | 6/2020 | Garvey et al. |
| 10,885,461 B2 | 1/2021 | Garvey et al. |
| 10,915,830 B2 | 2/2021 | Garvey et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0154044 A1* | 8/2003 | Lundstedt ........ G01N 35/00871 702/181 |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0065717 A1* | 3/2006 | Hurwitz ................. G06Q 20/02 235/381 |
| 2006/0087962 A1 | 4/2006 | Golia et al. |
| 2006/0106743 A1 | 5/2006 | Horvitz |
| 2006/0106797 A1 | 5/2006 | Srinivasa et al. |
| 2006/0161485 A1 | 7/2006 | Meldahl |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0024427 A1 | 1/2009 | Shan |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257026 A1 | 10/2010 | Brocklebank |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0265881 A1 | 10/2012 | Chen et al. |
| 2012/0278477 A1 | 11/2012 | Terrell et al. |
| 2012/0278663 A1 | 11/2012 | Hasegawa |
| 2012/0296696 A1 | 11/2012 | Cantor et al. |
| 2012/0323988 A1 | 12/2012 | Barzel et al. |
| 2013/0024173 A1 | 1/2013 | Brzezicki et al. |
| 2013/0080374 A1 | 3/2013 | Karlsson |
| 2013/0151179 A1 | 6/2013 | Gray |
| 2013/0226320 A1 | 8/2013 | Berg-Sonne et al. |
| 2013/0282891 A1 | 10/2013 | Davis et al. |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101119 A1* | 4/2014 | Li ..................... G06F 16/3331 707/706 |
| 2014/0101300 A1 | 4/2014 | Rosensweig et al. |
| 2014/0215470 A1 | 7/2014 | Alfonso |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |

(56) References Cited

U.S. PATENT DOCUMENTS

| | | |
|---|---|---|
| 2015/0317589 A1 | 11/2015 | Anderson et al. |
| 2015/0371144 A1 | 12/2015 | Engle |
| 2016/0034328 A1 | 2/2016 | Poola et al. |
| 2016/0042289 A1 | 2/2016 | Poola et al. |
| 2016/0071517 A1* | 3/2016 | Beaver .............. G06F 40/35 704/9 |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0241422 A1* | 8/2016 | Akita ............ H04L 25/03146 |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0032281 A1* | 2/2017 | Hsu ................ G05B 19/41875 |
| 2017/0061321 A1 | 3/2017 | Maiya et al. |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0329660 A1 | 11/2017 | Salunke et al. |
| 2017/0351563 A1 | 12/2017 | Miki et al. |
| 2017/0364851 A1 | 12/2017 | Maheshwari et al. |
| 2018/0026907 A1 | 1/2018 | Miller et al. |
| 2018/0039555 A1 | 2/2018 | Salunke et al. |
| 2018/0052804 A1 | 2/2018 | Mikami et al. |
| 2018/0053207 A1 | 2/2018 | Modani et al. |
| 2018/0059628 A1 | 3/2018 | Yoshida |
| 2018/0081629 A1 | 3/2018 | Kuhhirte et al. |
| 2018/0219889 A1 | 8/2018 | Oliner et al. |
| 2018/0268152 A1 | 9/2018 | Cuomo et al. |
| 2018/0321989 A1 | 11/2018 | Shetty et al. |
| 2018/0324199 A1 | 11/2018 | Crotinger et al. |
| 2018/0330433 A1 | 11/2018 | Frenzel et al. |
| 2018/0336479 A1* | 11/2018 | Guttmann .............. G06V 20/41 |
| 2018/0349797 A1 | 12/2018 | Garvey et al. |
| 2018/0351786 A1 | 12/2018 | Pope et al. |
| 2019/0042982 A1 | 2/2019 | Qu et al. |
| 2019/0065275 A1 | 2/2019 | Wong et al. |
| 2019/0305876 A1 | 10/2019 | Sundaresan et al. |
| 2019/0318417 A1* | 10/2019 | Gumaru ............ G06Q 30/0635 |
| 2019/0324458 A1* | 10/2019 | Sadeghi .............. G05D 1/0088 |
| 2019/0332680 A1* | 10/2019 | Wang .................... G10L 15/07 |
| 2020/0034745 A1 | 1/2020 | Nagpal et al. |
| 2020/0125988 A1 | 4/2020 | Garvey et al. |
| 2020/0301672 A1* | 9/2020 | Li .......................... G06F 8/73 |
| 2021/0257060 A1* | 8/2021 | Curtis .................... G16B 10/00 |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Jain and Chlamtac, P-Square Algorithm for Dynamic Calculation of Quantiles and Histograms Without Storing Observations, ACM, Oct. 1985 (10 pages).

Suntinger, "Trend-based similarity search in time-series data," 2010, Second International Conference on Advances in Databases, Knowledge, and Data Applications, IEEE, pp. 97-106 (Year 2010).

Li et al., "Forecasting Web Page Views: Methods and Observations," in 9 J. Machine Learning Res. 2217-50 (2008). (Year: 2008).

Yokoyama, Tetsuya, "Windows Server 2008, Certification Test, Part 5: Reliability", Apr. 15, 2008, pp. 124-125 along with 4 pages of English Translation.

Willy Tarreau: "HAProxy Architecture Guide", May 25, 2008 (May 25, 2008), XP055207566, Retrieved from the Internet URL:http://www.haproxy.org/download/1.2/doc/architecture.txt [retrieved on Aug. 13, 2015].

Wilks, Samuel S. "Determination of sample sizes for setting tolerance limits." The Annals of Mathematical Statistics 12.1 (1941): 91-96.

Voras I et al.: "Evaluating open-source cloud computing solutions", MIPRO, 2011 Proceedings of the 34th International Convention, IEEE, May 23, 2011 (May 23, 2011), pp. 209-214.

Voras et al., "Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", AGENTS '01, Montreal, Quebec, Canada, May 28-Jun. 1, 2001, pp. 262-269.

Slipe Iskyy, Rostyslav, "Security Issues in OpenStack", Master's Thesis, Technical University of Denmark, Jun. 2011, 90 pages.

Nurmi D et al.: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Lin, Xuemin, et al. "Continuously maintaining quantile summaries of the most recent n elements over a data stream." IEEE, 2004.

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Greunen, "Forecasting Methods for Cloud Hosted Resources, a comparison," 2015, 11th International Conference on Network and Service Management (CNSM), pp. 29-35 (Year: 2015).

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-DIGESTS.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform As-A-Service", Jan. 1, 2011 (Jan. 1, 2011), XP055207440, Retrieved from the Internet: URL:http://128.111.41.26/research/tech reports/reports/2011-01.pdf [retrieved on Aug. 12, 2015] pp. 2-6.

(56) References Cited

OTHER PUBLICATIONS

Charapko, Gorilla—Facebook's Cache for Time Series Data, http://charap.co/gorilla-facebooks-cache-for-monitoring-data/, Jan. 11, 2017.
Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.
Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].
Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.
Ahmed, Reservoir-based network traffic stream summarization for anomaly detection, Article in Pattern Analysis and Applications, Oct. 2017.
"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/ios-objectstorage-adminguide-cactus.pdf [retrieved on Aug. 12, 2015].
"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].
Yin, "System resource utilization analysis and prediction for cloud based applications under bursty workloads," 2014, Information Sciences, vol. 279, pp. 338-357 (Year: 2014).
Herbst, "Self-adaptive workload classification and forecasting for proactive resource provisioning", 2014, ICPE'13, pp. 187-198 (Year: 2014).
Carvalho et al., "Long-term SLOs for reclaimed cloud computing resources," 2014, In Proceedings of the ACM Symposium on Cloud Computing (SOCC '14). Association for Computing Machinery, New York, NY, USA, 1-13 (Year: 2014).
Ghosh, "Biting off safely more than you can chew: Predictive analytics for resource over-commit in iaas cloud," 2012, In 2012 IEEE Fifth International Conference on Cloud Computing, pp. 25-32 (Year: 2012).
Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.
Lehmann, "Variability of Atmospheric Circulation Patterns Associated With Large Volume Changes of the Baltic Sea", Adv. Sci. Res., 12, 219-225, 2015, www.adv-sci-res.net/12/219/2015/doi: 10.5.194/asr-12-219-2015 (Year: 2015).
Toreti, "A Novel Approach for the Detection of Inhomogeneities Affecting Climate Time Series", Journal of Applied Meteorology and Climatology, vol. 51, Feb. 2012, DOI: 10.1175/JAMC-D-10-05033.1 (Year: 2012).
Zhai, "Spatial Variation and Trends in Pdsi and Spi Indices and Their Relation To Streamflow in 10 Large Regions of China", 2010, Journal of Climate, vol. 23, 2010 American Meteorological Society, DOI: 10.1175/2009JCLI2968.1 (Year: 2010).

\* cited by examiner

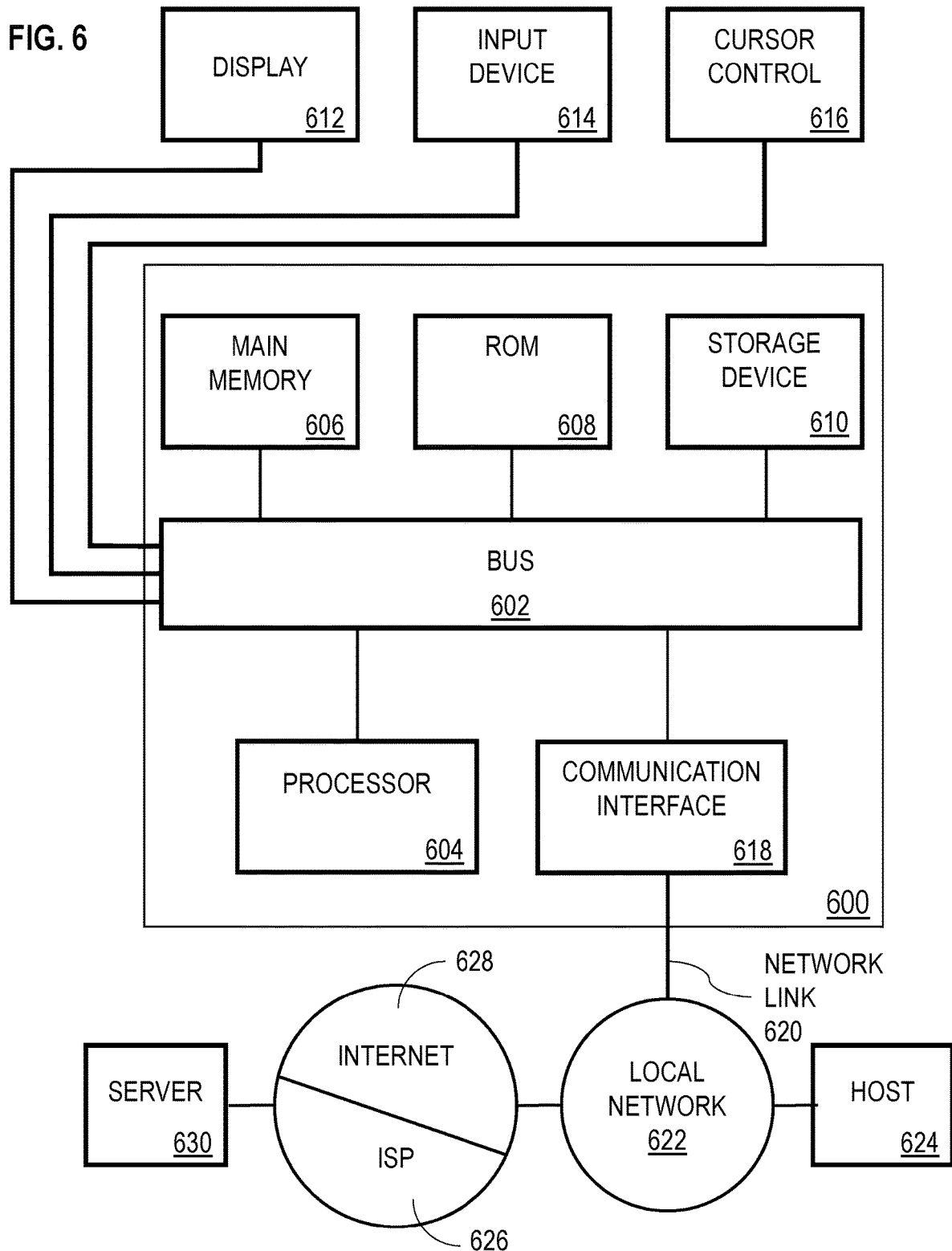

SYSTEMS AND METHODS FOR UNSUPERVISED ANOMALY DETECTION USING NON-PARAMETRIC TOLERANCE INTERVALS OVER A SLIDING WINDOW OF T-DIGESTS

RELATED APPLICATIONS

The present application is related to U.S. application Ser. No. 15/609,938, titled "UNSUPERVISED METHOD FOR BASELINING AND ANOMALY DETECTION IN TIME-SERIES DATA FOR ENTERPRISE SYSTEMS"; U.S. application Ser. No. 16/000,602, titled "METHODS AND SYSTEMS FOR AGGREGATING DISTRIBUTION APPROXIMATIONS"; U.S. application Ser. No. 16/000,677, titled "SCALABLE METHODS AND SYSTEMS FOR APPROXIMATING STATISTICAL DISTRIBUTIONS"; U.S. application Ser. No. 15/140,358, now U.S. Pat. No. 10,073,906, titled "SCALABLE TRI-POINT ARBITRATION AND CLUSTERING"; and U.S. application Ser. No. 15/155,486, now U.S. Pat. No. 10,198,339, titled "CORRELATION-BASED ANALYTIC FOR TIME-SERIES DATA"; U.S. application Ser. No. 14/452,283, now U.S. Pat. No. 10,069,900, titled "SYSTEMS AND METHODS FOR ADAPTIVE THRESHOLDING USING MAXIMUM CONCENTRATION INTERVALS"; the entire contents

TECHNICAL FIELD

The present disclosure relates to machine-learning techniques for unsupervised anomaly detection.

BACKGROUND

Anomaly detection involves systems and processes for identifying behavior that does not conform to expectations. On enterprise and cloud computing platforms, for instance, anomaly detection may provide warnings if unusual behavior is exhibited by metric data collected from system hardware and software resources. If left unaddressed, anomalous behavior may compromise system security and performance. Anomaly detection systems attempt to mitigate such performance degradation by detecting and treating anomalies as efficiently as possible.

Anomaly detection is complicated by the significant variance in behavior from one system to the next. For example, a typical pattern of resource usage in one datacenter environment may have different patterns of highs and lows than in another datacenter environment. Further, patterns between individual resources within the same datacenter may significantly vary. As a result, behavior that is anomalous in one computing environment may not be anomalous in another environment.

Threshold-based alerting is an example approach to anomaly detection. According to this approach, a user defines the acceptable range of values, and an alarm is triggered if a monitored value falls outside the user-defined range. The user may define the thresholds based on specific domain knowledge of the system to supervise the anomaly detection process such that the thresholds are tailored for specific behavior exhibited by the system. This approach allows the user to inject domain knowledge into the system to supervise the anomaly detection process. However, selecting the appropriate thresholds on which to trigger alerts may be complicated based on the large number of anomalous events that may occur in large-scale systems. Adding to the complexity, system resources may exhibit trends, seasonal fluctuations, and other time-varying behaviors that evolve over time. A user may be unaware of and/or unable to keep up with normal behavioral patterns. As a result, users may be prone to selecting sub-optimal thresholds, which may result in false positive alerts that flag normal system behavior and/or neglect other system behavior that is anomalous.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 illustrates an example computer system on which one or more embodiments may be implemented.

DETAILED DESCRIPTION

Figure 1:
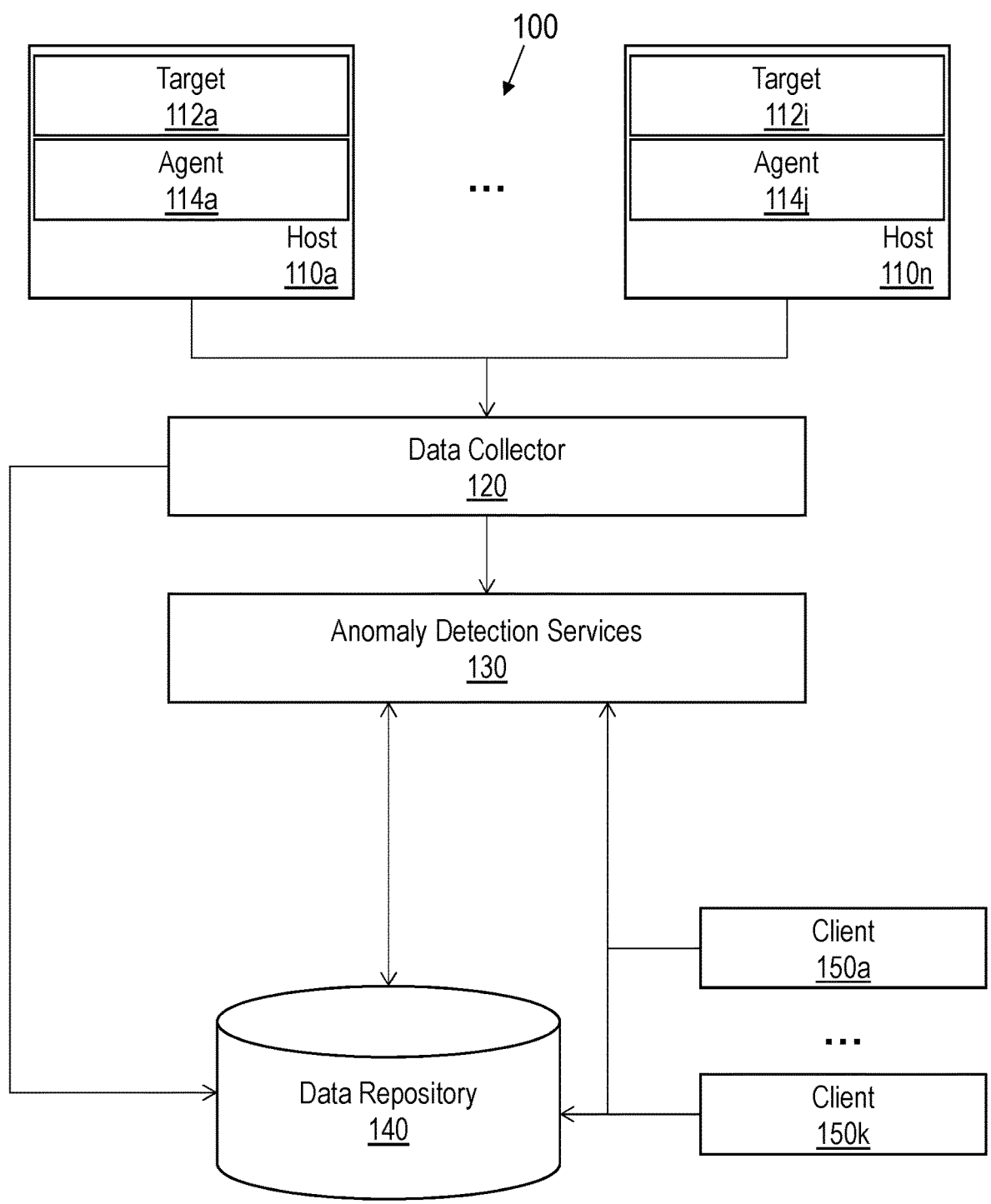
FIG. 1 illustrates a system for performing unsupervised anomaly detection in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW 2.0 ARCHITECTURAL AND FUNCTIONAL OVERVIEW 3.0 UNSUPERVISED MODEL TRAINING 3.1 SLIDING WINDOW OF T-DIGESTS 3.2 NON-PARAMETRIC TOLERANCE INTERVALS 4.0 UNSUPERVISED MONITORING AND ANOMALY DETECTION 4.1 EVALUATION PROCESS 4.2 EXAMPLE APPLICATIONS 5.0 COMPUTER NETWORKS AND CLOUD NETWORKS 6.0 MICROSERVICE APPLICATIONS
7.0 HARDWARE OVERVIEW
8.0 MISCELLANEOUS; EXTENSIONS

1.0 General Overview

Computer systems monitoring is a critical task in cloud based ecosystems. A subtask of computer systems monitoring is to detect anomalies on the hardware or software components of those systems. One example framework is to periodically collect metrics from those systems, hence generating time series, and then using such data for anomaly detection. Within this framework, anomalies may be classified into distinct groups including one in which there are time-dependent patterns of the data, such as patterns that recur on a seasonal basis, and another where patterns are not time-dependent (i.e., non-seasonal patterns).

An example anomaly detection system for cloud-based ecosystems is described in U.S. application Ser. No. 15/609,938, previously incorporated by reference. The system described therein includes a seasonal component for detecting seasonal patterns within time-series datasets and a non-seasonal component for detecting patterns that are not time-dependent. An example implementation described therein included a non-seasonal component using Maximum Concentration Intervals (MCI). A further description of MCI is provided in U.S. application Ser. No. 14/452,283, previously incorporated by reference. The MCI may be used to represent the normality of the data, also referred to as a baseline. The baseline may be used to flag anomalies in future observations of the same metric.

The MCI technique for baselining is useful in many applications; however, there are potential drawbacks. Some use cases, such as those integrated into a software development kit or a cloud service, would benefit greatly from a streaming capability. However, the computation of the MCI is generally achieved by storing all the different data values seen so far, which does not allow for streaming. Further, storing a large number of data points may stress storage and memory consumption. As a result, model updates may be relatively slow and/or resource-intensive. Some use cases further benefit from the ability to "forget" data older that a configurable period of time, which is non-trivial to implement in a scalable fashion.

Systems and methods are described herein allow for streaming capability for quantile estimates. The streaming capability may be used to update the upper and lower limits of a tolerance interval in real-time as new data packets are received. The techniques further allow for quantile values to be estimated over a sliding window of streamed data. Data points that fall outside a configured window size may be expired. Stated another way, once a value in a data stream is older than a configurable period of time, the value is no longer incorporated into the quantile estimation or the anomaly detection model. Thus, past behavior may intentionally be "forgotten" by the anomaly detection system.

Systems and methods are further described herein for unsupervised anomaly detection using non-parametric tolerance intervals. Non-parametric methods for computing tolerance intervals allow for order statistics to be computed as a function of the size of a training dataset, without knowing any values or patterns in the training dataset. For example, the index k, representing the kth element in a sorted array (kth order statistic) may be estimated without any knowledge of the actual values according to a non-parametric method referred to as the Wilks method, which is described in Wilks, Samuel S. "Determination of sample sizes for setting tolerance limits." The Annals of Mathematical Statistics 12.1 (1941): 91-96, hereby incorporated by reference as if set forth in its entirety. While the method does not require the actual data, it assume its probability distribution is continuous to estimate the indexes. Such indexes may be converted to quantiles probabilities (the percentage of data represented by a particular quantile), which may be used for estimating corresponding quantile values in data streams.

A q-quantile or just quantile, as used herein, refers to a cut point for dividing a data distribution into intervals. For instance, a specific percentile (e.g., 90th percentile, 95th percentile, etc.) is an example of a quantile (where the associated probability q is 0.90, 0.95, etc.). Other examples of quantiles include, without limitation, octiles and deciles. A tolerance interval may be defined with a lower limit quantile probability and an upper limit quantile probability (e.g., 0.5 and 0.95). The associated quantiles (e.g., the metric values representing the 5th and 95th percentiles) for the upper and lower quantile probabilities, however, may vary depending on the distribution of values in the training dataset.

In some embodiments, a data distribution for a training dataset is approximated by a t-digest data structure. Example techniques for generating t-digest are described further in U.S. application Ser. No. 16/000,602 and U.S. application Ser. No. 16/000,677, previously incorporated by reference. The use of t-digest provides a space efficient and mergeable summary of data for quantile estimation. In particular, quantiles may be estimated without the need to maintain each and every data point of a training dataset in volatile or non-volatile storage, alleviating memory requirements and processing overhead. In some embodiments, the t-digest structures may be capped to a certain memory footprint. Further, the t-digest structure has the capability of estimating quantile values within the training dataset with high accuracy at the tails of the distribution, which is a region of interest for anomaly detection systems.

In some embodiments, training an anomaly detection model comprises determining, as a function of the size of a training dataset, an upper quantile probability and a lower quantile probability that represent a tolerance interval for covering a prescribed proportion of values for a particular metric, at a prescribed confidence level. It is noted that the quantile probabilities of the tolerance interval do not change so long as the size of the training dataset remains the same. Thus, these values may be cached when a sliding window is used to constrain the training dataset to a fixed size. The estimated quantiles may change as the distribution of data evolves over time. The quantiles may be approximated as a function of the t-digest structure, which, as previously mentioned, may be updated in real-time (e.g., instantly or near instantaneously during application runtime) as a function of an input data stream.

In some embodiments, an anomaly detection system uses the trained model to monitor metric data for anomalies. For example, the system may monitor a time-series signal carrying a sequence of metric values for data points that fall outside of a tolerance interval defined by the trained upper and lower limits. The anomaly detection may trigger one or more responsive actions if at least one value falls outside the tolerance interval to provide warning of anomalous behavior and take appropriate steps to address the problem.

In sensitive systems, a single value outside of the uncertainty interval may trigger an alert. In other embodiments, small deviations may be permitted without triggering an alert. To prevent the system from flagging every data point that is outside of the range of values defined by the tolerance interval, smoothed expectation windows and/or cumulative summing techniques may be applied during evaluation, as described further herein. The techniques may reduce false positives caused by measurement drift and reduce the volume of alerts to a more manageable level. The techniques were also observed to produce fewer false flags than the MCI approach.

One or more embodiments described in this Specification and/or recited in the claims may not be included in this General Overview section.

2. Architectural Overview

In some embodiments, systems described herein include software and/or hardware components configured to process time series signals. A time series signal comprises a sequence of values that are captured over time. The source of the time series data and the type of information that is captured may vary from implementation to implementation. For example, a time series may be collected from one or more software and/or hardware resources and capture various performance attributes of the computing resources from which the sample data points were collected. As another example, a time series may be collected using one or more sensors that measure physical properties, such as temperature, pressure, motion, traffic flow, physiological metrics or other attributes of an object or environment.

In some embodiments, systems described herein capture time series signals from multiple entities of an application. An entity in this context may correspond to a software resource, hardware resource, or some other component used in the functioning of an application. In some embodiments, an application follows a multi-tier or multilayered architecture. For example, a three-tier architecture may include a presentation tier for providing a user interface, an application tier for executing the core application logic, and a data tier for managing data access. Each tier may comprise one or more components that are logically and/or physically separated from other tiers. In the three-tier architecture, the presentation tier may comprise one or more web servers, the application tier one or more application servers, and the data tier one or more database servers. However, the number of tiers and the components deployed therein may vary from one implementation to the next.

In some embodiments, multiple time series may be generated for a single entity to track different metrics. As an example, for a given database server, one time series may track the number of active database sessions, a second may track the average query response times, and a third may track the average sequential data read times. As another example, for a given host, a first time series may track the central processing unit (CPU) utilization rate and a second may track the memory utilization rate. The number and types of metrics that are collected for each entity may thus vary from implementation to implementation.

FIG. 1 illustrates a system for performing unsupervised anomaly detection in accordance with some embodiments. System 100 generally comprises hosts 110a-n, data collector 120, anomaly detection services 130, data repository 140, and clients 150a-k. The components illustrated in FIG. 1 may be implemented in software and/or hardware. Each component may be distributed over multiple applications and/or machines. Multiple components may be combined into one application and/or machine. Operations described with respect to one component may instead be performed by another component.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Hosts 110a-n represent a set of one or more network hosts and generally comprise targets 112a-i and agents 114a-j. A "target" in this context refers to a resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

Agents 114a-j comprise hardware and/or software logic for capturing time-series measurements from a corresponding target (or set of targets) and sending these metrics to data collector 120. In some embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, etc., that capture time-series measurements of a physical environment and/or resource. Although only one agent and target are illustrated per host in FIG. 1, the number of agents and/or targets per host may vary from implementation to implementation. Multiple agents may be installed on a given host to monitor different target sources of time series data. In other embodiments, an agent that resides remotely on a different host than a target may be responsible for collecting sample time-series data from the target.

Data collector 120 includes logic for aggregating data captured by agents 114a-j into a set of one or more time-series. Data collector 120 may store the time series data in data repository 140 and/or provide the time-series data to anomaly detection services 130. In some embodiments, data collector 120 receives data from agents 114a-j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Anomaly detection services 130 includes logic for training models that represent the behavior of a set of time-series data and evaluating the models to detect anomalous behavior. Anomaly detection services 130 may implement techniques described in further detail below to perform unsupervised baselining and anomaly detection on one or more time series signals originating from targets 112a-i. Anomaly detection services 130 may comprise logic for generating machine-learning (ML) models, monitoring time series signals for anomalies using the ML models, and triggering responsive actions when anomalies are detected.

Data repository 140 includes volatile and/or non-volatile storage for storing data that is generated and/or used by anomaly detection services 130. Example data that may be stored may include, without limitation, time-series data collected, trained model components (e.g., learned tolerance intervals), and anomaly report data. Data repository 140 may reside on a different host machine, such as a storage server that is physically separate from anomaly detection services 130, or may be allocated from volatile or non-volatile storage on the same host machine.

Clients 150*a-k* represent one or more clients that may access anomaly detection services 130 to generate anomaly detection models and/or monitor incoming data for anomalies. A "client" in this context may be a human user, such as an administrator, a client program, or some other application instance. A client may execute locally on the same host as analytic services 130 or may execute on a different machine. If executing on a different machine, such as in the case with clients of cloud services, the client may communicate with anomaly detection services 130 via one or more data communication protocols according to a client-server model, such as by submitting HTTP requests invoking one or more of the services and receiving HTTP responses comprising results generated by one or more of the services. Anomaly detection services 130 may provide clients 150*a-k* with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

Figure 2:
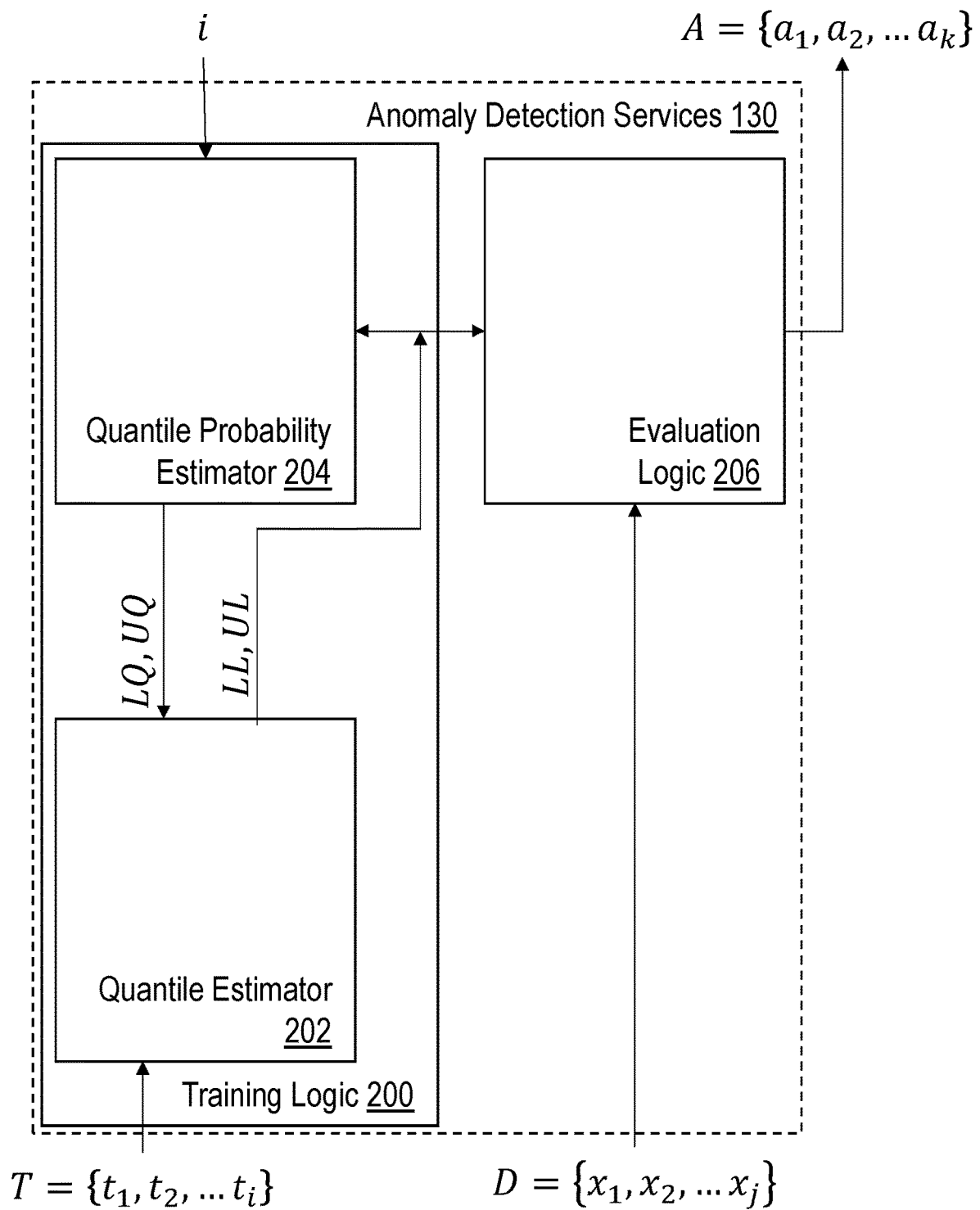
FIG. 2 illustrates an example data flow for an anomaly detection service in accordance with some embodiments.

FIG. 2 illustrates an example data flow for an anomaly detection service in accordance with some embodiments. Anomaly detection services 130 includes training logic 200 and evaluation logic 206. Training logic 200 receives as input a training dataset denoted T comprising data points $\{t_1, t_2, \ldots t\underline{i}\}$. The training dataset may comprise historical values, values streamed through another component of system 100 (e.g., by data collector 120), hypothetical values provided by a client, and/or values streamed from a component external to system 100.

Training logic 200 comprises quantile estimator 202 and quantile probability estimator 204. Quantile estimator 202 produces a sliding window of t-digest structures that approximate the distribution of training dataset T. The t-digest structures do not require the anomaly detection system 100 to save all the different values observed in a data stream. The set of a t-digest structures may summarize the training data into a small list of structures referred to as centroids, which are much smaller than the overall training dataset. For example, a t-digest structure may summarize several thousand data points with 100 centroids.

Quantile probability estimator 204 receives, as input, the size i (i.e., the number of data points) of training dataset T. In some embodiments, quantile probability estimator 204 computes two order statistics using the Wilks method. The order statistics may then be converted to corresponding quantile probabilities including a lower quantile probability quantile denoted LQ and an upper quantile probability denoted UQ. These quantile probabilities represent the upper and lower probabilities for a tolerance interval covering a prescribed proportion of values for the particular metric within a prescribed confidence level. Techniques for computing these values are described further below. In some embodiments, quantile probability estimator 204 queries quantile estimator 202 for the corresponding quantiles, which may be determined as a function of the sliding window of t-digest structures. These quantiles may be used as the lower and upper limits in the trained anomaly detection model.

Evaluation logic 206 receives the trained upper and lower limits and monitors a set of input dataset denoted D comprising data points $\{d_1, d_2, \ldots d\underline{j}\}$. The input dataset D may be the same as the training dataset T or a different dataset, depending on the particular implementation. Evaluation logic 206 may compare the input data points to the upper and lower limits to determine whether any of the data points fall outside of the range. Evaluation logic 206 may output an alarm denoted A if any anomalies are detected. The alarm may comprise data points $\{\alpha_1, \alpha_2, \ldots \alpha\underline{k}\}$ identifying which data points in dataset D are above the upper limit or below the lower limit.

3.0 Unsupervised Model Training 3.1 Sliding Window of T-Digests

As previously mentioned, a t-digest structure may approximate or represent a distribution of samples. The manner in which the t-digest structures are generated may vary from implementation to implementation. Examples of processes for generating t-digest clusters are provided below, although other techniques may also be used. Examples are further described in U.S. application Ser. No. 16/000,677. Order-based statistics, such as percentiles and other forms of quantiles, may be calculated by analyzing the summaries inside a t-digest structure.

In some embodiments, generating a t-digest structure comprises maintaining a list of centroids, denoted $C=[c_1 \ldots c_n]$, where n corresponds to the total number of centroids. A mean and a count value are stored for each centroid. The set of centroids may initially be maintained as an empty list. The mean and count value for the set of centroids may be updated as new samples are received.

In some embodiments, the number of samples assigned to a cluster (or centroid) is constrained to an upper limit. The upper limit and size of a cluster may be calculated as a function of a delta parameter such that clusters representing the tail ends of the distribution are smaller in size than those near the middle of the distribution. This approach allows for accurate quantile estimations at the extremes of the distribution while maintaining a low storage footprint.

In some embodiments, the anomaly detection system maintains a sliding window of t-digest structures. The sliding window may comprise a shifting array of elements referred to herein as buckets. Each bucket includes a lower level t-digest structure, which may be represented as a set of centroids. A default value of 20 buckets with a maximum of 100 centroids each was tested and observed to yield scalable and accurate results. Using this value, the maximum number of centroids across all buckets was 2000. However, the number of centroids and t-digest structures may vary from implementation to implementation. This approach constrains the memory requirements for the t-digest structures to a constant size, providing scalability in the memory dimension. The space complexity of the t-digest may be expressed as O(k), where k is the number of centroids and each centroid uses O(1) space.

Once a bucket is full, a new bucket may be generated to accommodate new data points. Buckets may expire and be removed when the total number of data points exceeds a threshold. This approach prevents data points that are older than the configurable window from being incorporated into the trained anomaly detection model.

In some embodiments, the configured window-size is specified in terms of time. For example, a user may specify a window in terms of days, weeks, or some other timeframe.

The configured window-size determines at runtime the amount of data to be summarized on each t-digest. For example, it may be determined from the sample rate and the window size how many data points will be summarized by each t-digest structure. The number of buckets may also be adjusted as a function of the window size. A greater number of buckets may be allocated as the window-size increases. In other embodiments, the number of buckets may remain fixed regardless of the window size to maintain a compact representation. Additionally or alternatively, the window-size may be specified in terms of the number of data points to summarize rather than a timeframe. Thus, the implementation of the window of t-digests may vary from implementation to implementation.

Figure 3A:
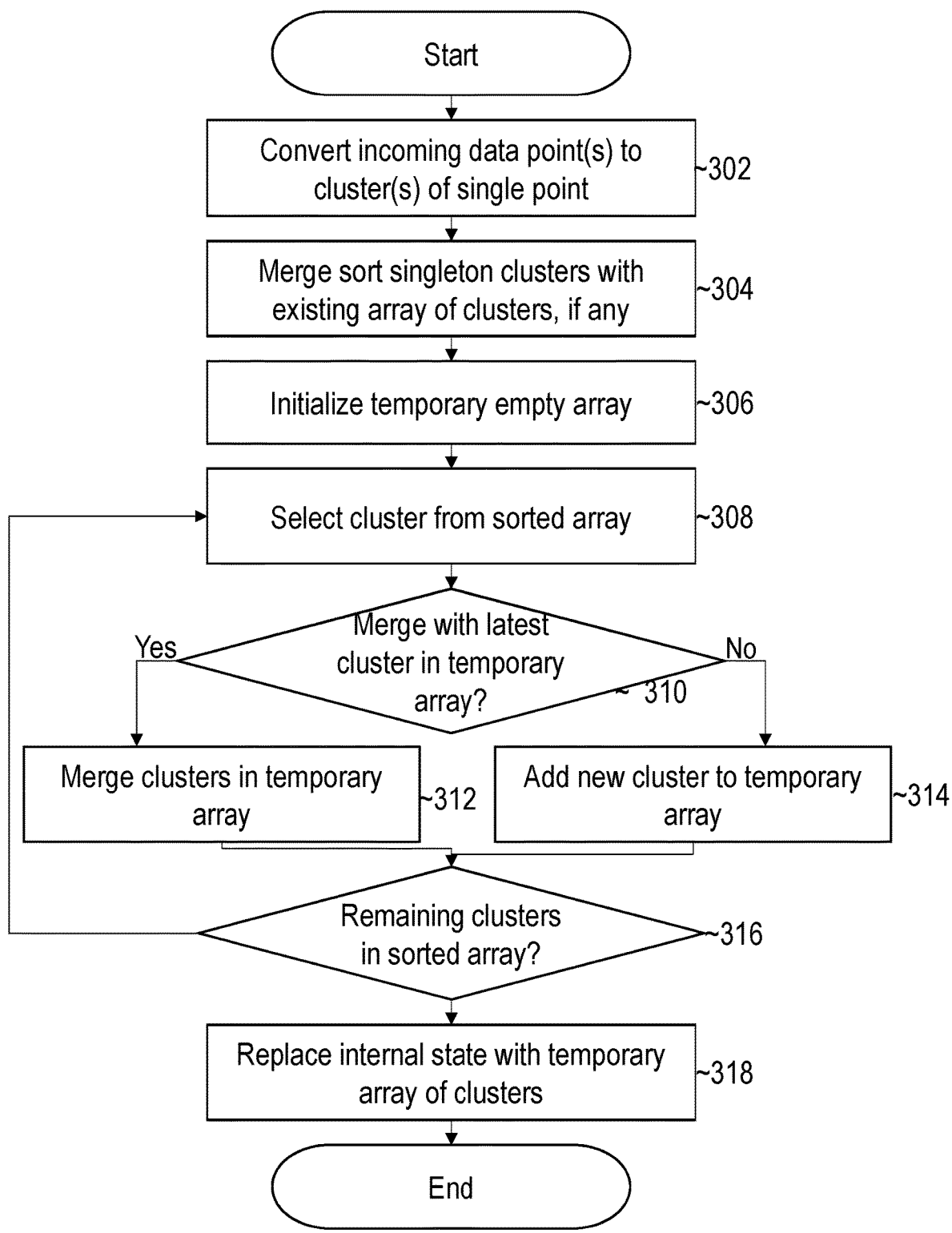
FIG. 3A illustrates an example set of operations for generating a t-digest structure for approximating a distribution of data in accordance with some embodiments.
Figure 3B:
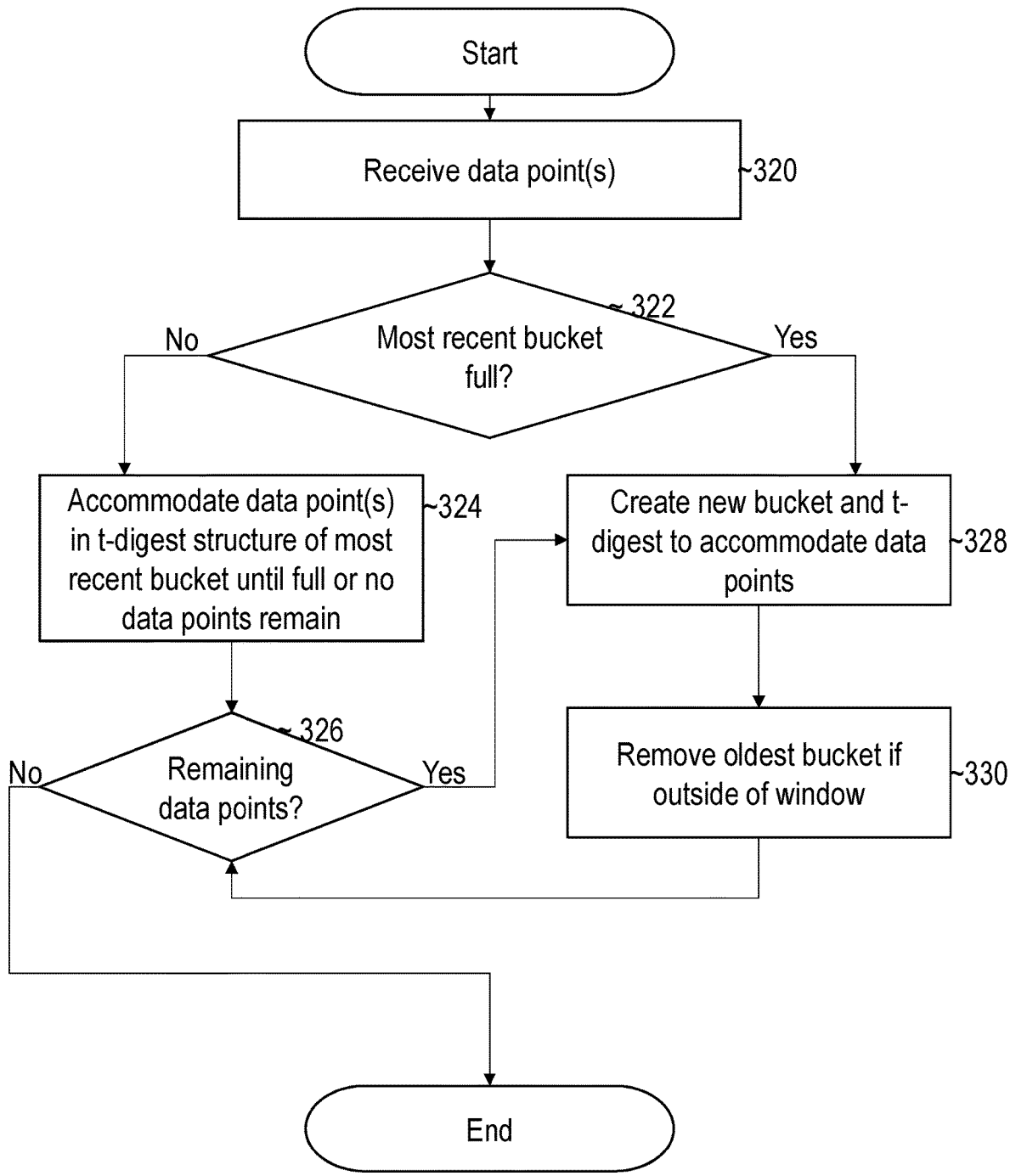
FIG. 3B illustrates an example set of operations for maintaining a sliding set of t-digests in accordance with some embodiments.

FIG. 3A illustrates an example set of operations for generating a t-digest structure for approximating a distribution of data in accordance with some embodiments. FIG. 3B illustrates an example set of operations for maintaining a sliding set of t-digests in accordance with some embodiments. The process depicted in FIG. 3A may be thought of as a lower layer process for generating a t-digest structure corresponding to a single bucket. The process in FIG. 3B represents an upper layer process for maintaining a sliding window of t-digests. One or more operations illustrated in FIG. 3A and/or FIG. 3B may be modified, rearranged, or omitted all together. Accordingly, the particular sequence of operations illustrated in FIG. 3A and FIG. 3B should not be construed as limiting the scope of one or more embodiments.

Referring to FIG. 3A, the process comprises converting one or more data points into one or more corresponding clusters having a single point each (operation 302). For example, if three data points are received, then a set of three singleton clusters may be generated. A singleton cluster may be represented by a centroid where the average value is equal to the value of the data point assigned to the cluster and, as the name implies, a count value of one.

The process next sorts the singleton clusters with an existing array of clusters, if any (operation 304). For example, the existing array may include a set of centroids that have varying mean (or average) and count values, such as previously described. In some embodiments, the process sorts the centroids by mean value, such as from low to high. A merge sort is computationally efficient in this context, although other sorting algorithms may be used to order the clusters by mean value, depending on the particular implementation. Also, it is noted that the mean value may be pre-computed or computed at runtime, depending on the implementation. In the latter case, the sum of the data points may be maintained for a cluster. The process may then compute the mean by dividing the sum by the count value for the cluster.

The process further comprises initializing a temporary empty array (operation 306). The temporary array is used to update the t-digest structure per the operations described below.

Once the temporary array has been initialized, the process selects a cluster from the sorted array (operation 308). For example, the process may start with the first cluster in the array and iterate sequentially over the array until all the clusters have been processed.

For the selected cluster, the process determines whether it should be merged with the latest cluster in the temporary array (operation 310). The merge may be determined based on whether the selected cluster fits within the capacity of the latest cluster. The merge condition may be determined based on the upper limit for the latest cluster, as previously described. At the tail ends of the distribution, the capacity may be relatively small when compared to clusters in the middle of the array.

If the merge condition is satisfied, then the process merges the clusters in the temporary array (operation 312). To merge the clusters, a mean value for a centroid of the new cluster may be computed as a function of the mean values for the two clusters being merged weighted by the number of data points in each cluster. The count value for the new cluster may be computed by summing the count values for the two clusters being merged.

If the merge condition is not satisfied, then the process adds the selected cluster to the temporary array (operation 314).

Once the selected cluster has been merged or added as a new cluster to the temporary array, the process determines whether there are any remaining clusters to analyze in the sorted array (operation 316). If so, the process may return to operation 308 and iterate over each of the remaining clusters until all clusters have been processed.

The process then replaces the internal state of the t-digest structure with the temporary array of clusters (operation 318). Thus, the updated set of clusters represents the new t-digest summarizing the distribution of data.

As previously mentioned, FIG. 3B illustrates an example process for maintaining a sliding window of t-digests. The window may include a plurality of buckets, where each bucket approximates a threshold number of data points. Stated another way, each bucket may be configured to approximate a different portion of the dataset. The threshold may be computed as a function of the size of the training dataset and the number of buckets in the sliding window. For example, the threshold may be represented by dividing the number of data points in the training dataset by the number of buckets to distribute the data points evenly among the buckets.

Referring to FIG. 3B, the process receives one or more data points (operation 320). For example, the sample data point may be a performance metric collected from a target resource at a sampling interval. In some embodiments, the sample data points may be streamed, as previously described. In other cases, the process may iterate through a set of values in a stored dataset.

The process next determines whether the most recent bucket is full (operation 322). The determination may be made based on whether the maximum threshold of data points has already been accommodated by the t-digest structure in the most recent bucket. The most recent bucket may accommodate some, all, or none of the data points received at operation 320 depending on how much space is left in the bucket.

If there is enough space for at least a subset of the data points, then the process accommodates the data points in the t-digest structure of the most recent bucket until the bucket is full or no data points remain (operation 324). The data points may be accommodated according to the process described in FIG. 3A above.

The process next determines whether there are any data points remaining that were not able to be accommodated by the t-digest structure of the most recent bucket (operation 326). If so, then the remaining data points may be split off into a new bucket. If there are no remaining data points to accommodate, then the process ends.

If all or a subset of the data points received at operation 320 could not be accommodated by the most recent bucket, then a new bucket and t-digest structure are created to accommodate the data points. (operation 328). For example, the process depicted in FIG. 3B may be invoked to accommodate these data points in a t-digest structure for the new bucket.

The process may further remove the oldest bucket if outside of the configured window (operation 330). When the buckets are initially built, the oldest bucket may not summarize data old enough to fall outside of the configured window. Once enough buckets have been formed, the distribution of data may be configured such that the oldest bucket summarizes data older than the window and is therefore removed each time a new bucket is created. The result is a fixed number of buckets, which may be configurable as previously indicated. For example, twenty buckets may be maintained at any given time, where each bucket has a maximum number of centroids summarizing a different portion of the training dataset.

The result of FIG. 3B is a sliding array of t-digest structures. These structures may be used to estimate and stream quantiles as described further below.

3.2 Non-Parametric Tolerance Intervals

In some embodiments, quantile probability estimator 204 is configured to determine the upper and lower quantile probabilities that represent the bounds of a non-parametric tolerance interval. A non-parametric tolerance interval allows for quantile probabilities to be determined without assuming that the data has a particular distribution excepting that the data may be represented by a probability density function and has a continuous variable.

In some embodiments, a tolerance interval is characterized by the parameters p and $\beta$. The parameter p, which is referred to as the "coverage percentage", represents the proportion of the total population of values that one wants to cover with the interval. The parameter $\beta$ is the confidence level, which in this case represents the probability that the interval actually covers p percent of the population. The term "population" is used in a generic sense and may refer to the total set of possible values for a random variable x. For example, it may be a metric from a system where anomaly detection is desired.

As previously mentioned, a non-parametric tolerance interval may be computed from a sample size n. One approach is to use the Wilks method to compute the distribution for the parameter p. According to this approach, the coverage percentage p of interval $\{x_r, x_{n-r+1}\}$ behaves like a random variable with PDF $g(p)=Beta(p; n-2r+1, 2r)$ where n is the number of data points in the training dataset, and candidate index $r \in [1,n]$. The result is that such distribution only depends on the sample size n and the selected index r. The PDF gives the likelihood that the coverage percentage is precisely the given value p even without having any knowledge of the underlying values in the training dataset.

In some embodiments, tolerance intervals are computed using the result from the Wilks method. Some example embodiments below are presented using R code. However, embodiments may be implemented using other languages and/or logic depending on the particular implementation. The examples are intended to illustrate how the distribution g(p) can be used to compute the non-parametric tolerance interval with specified confidence level $\beta$.

In some embodiments, the specified parameter $\beta$ represents the minimum confidence level. That is, the probability of the interval having coverage p is at least $\beta$. Given the PDF of coverage percentage from the Wilks method, the probability may be expressed in terms of the cumulative distribution function of the Beta distribution at p, which is the known Regularized Incomplete Gamma function $I_p$. The resulting expression is:

$$1-I_p(n-2r+1,2r)>=\beta$$

The expression is possible because the CDF alone, that is $I_p(n-2r+1,2r)$, provides what is the accumulated probability of the coverage percentage. That is, the CDF provides what is the probability that it takes values from 0 to p. Hence, $1-I_p(n-2r+1,2r)$ gives the complement, which is the probability that the coverage percentage is p or bigger. The latter is useful to compute the tolerance interval.

In some embodiments, the training process may search among all possible values of $r \in [1,n]$ to determine which ones satisfy the condition above of $1-I_p(n-2r+1,2r)>=\beta$. There may be many indexes r for which the condition holds. In such scenarios, the "most economical" index may be selected. That is, the index which is not bigger than necessary. In the present context, this value is the index associated with the minimum probability that is still greater than or equal to $\beta$. Without such an optimization, the tendency would be to use the first index r=1 as its associated probability would typically be higher than the given parameter $\beta$. This selection would generally not be useful for anomaly detection since it would result in returning the whole interval $[x_1, x_n]$. The search may be optimized by leveraging the fact that intervals $\{x_r, x_{n-r+1}\}$ are symmetric. Hence the search may be restricted to n/2 values instead of n. Additionally or alternatively, other search optimizations may be implemented to find candidate index r.

As an example implementation of the above techniques, p may be set to 0.9 and $\beta$ may be set to 0.95. That is, the parameters are defined to search for a tolerance interval covering 90% of the population with a 95% level of confidence. As previously noted, these parameters may vary depending on the particular implementation and be configurable by an end user. In the present example, the size n of the training dataset in 120 elements. A relatively small dataset was chosen to facilitate illustration, though the training dataset may include significantly more data points. In R, the CDF of the Beta distribution $I_p(n-2r+1,2r)$ is the function pbeta(p, n-2*r+1, 2*r). Table 1 below shows the example R code for computing all the associated probabilities of the indexes.

TABLE 1

R code for computing probabilities using different candidate indexes where n = 120 p = 0.9
n = 120
r = 1:floor(n/2)
round(1 − pbeta(p, n − 2*r + 1, 2*r), 4)

Table 2 shows the example results of computing the associated probabilities.

TABLE 2

Probabilities for associated indexes

| ## [1] | 1.0000 | 0.9984 | 0.9840 | 0.9216 | 0.7714 | 0.5445 | 0.3127 | 0.1440 | 0.0531 | 0.0158 |
|---|---|---|---|---|---|---|---|---|---|---|
| ## [11] | 0.0038 | 0.0008 | 0.0001 | 0.0000 | 0.0000 | 0.0000 | 0.0000 | 0.0000 | 0.0000 | 0.0000 |
| ## [21] | 0.0000 | 0.0000 | 0.0000 | 0.0000 | 0.0000 | 0.0000 | 0.0000 | 0.0000 | 0.0000 | 0.0000 |

TABLE 2-continued

Probabilities for associated indexes

| ## [31] | 0.0000 | 0.0000 | 0.0000 | 0.0000 | 0.0000 | 0.0000 | 0.0000 | 0.0000 | 0.0000 | 0.0000 |
| ## [41] | 0.0000 | 0.0000 | 0.0000 | 0.0000 | 0.0000 | 0.0000 | 0.0000 | 0.0000 | 0.0000 | 0.0000 |
| ## [51] | 0.0000 | 0.0000 | 0.0000 | 0.0000 | 0.0000 | 0.0000 | 0.0000 | 0.0000 | 0.0000 | 0.0000 |

Considering that R indexes start at 1, it may be observed the candidate index r=3 satisfies tolerance interval criteria. That is, the candidate index has an associated probability of 0.984 of producing an interval that covers 90% of the population and such is the smallest probability meeting condition of being greater than or equal to 0.95. This means that lower index r satisfying the criteria is 3 and the upper index, n-r+1, is 118. Thus, the tolerance interval may be represented as [3, 118]. As can be seen, these values were computed without any concrete values from the training dataset. The process may be thought of as working with an abstract array that searches for the best index r. Once located, such positions (e.g., [3, 118]) may serve as a "template" to arrange any sample of size n from any population. Thus, once determined, these values may be cached and used as long as the size of the training dataset remains unchanged.

If the system had a concrete sample of data, it may be sorted such that the values at the specified index are used to build the tolerance intervals. However, as previously mentioned, when several thousand data points are being streamed, such an approach may be memory and computationally expensive, negatively impacting scalability. Thus, the lower and upper indexes may be converted to quantile probabilities and used to query the sliding window of t-digests. The corresponding quantile values returned from the t-digest structures may then be used to build the tolerance intervals.

Figure 4:
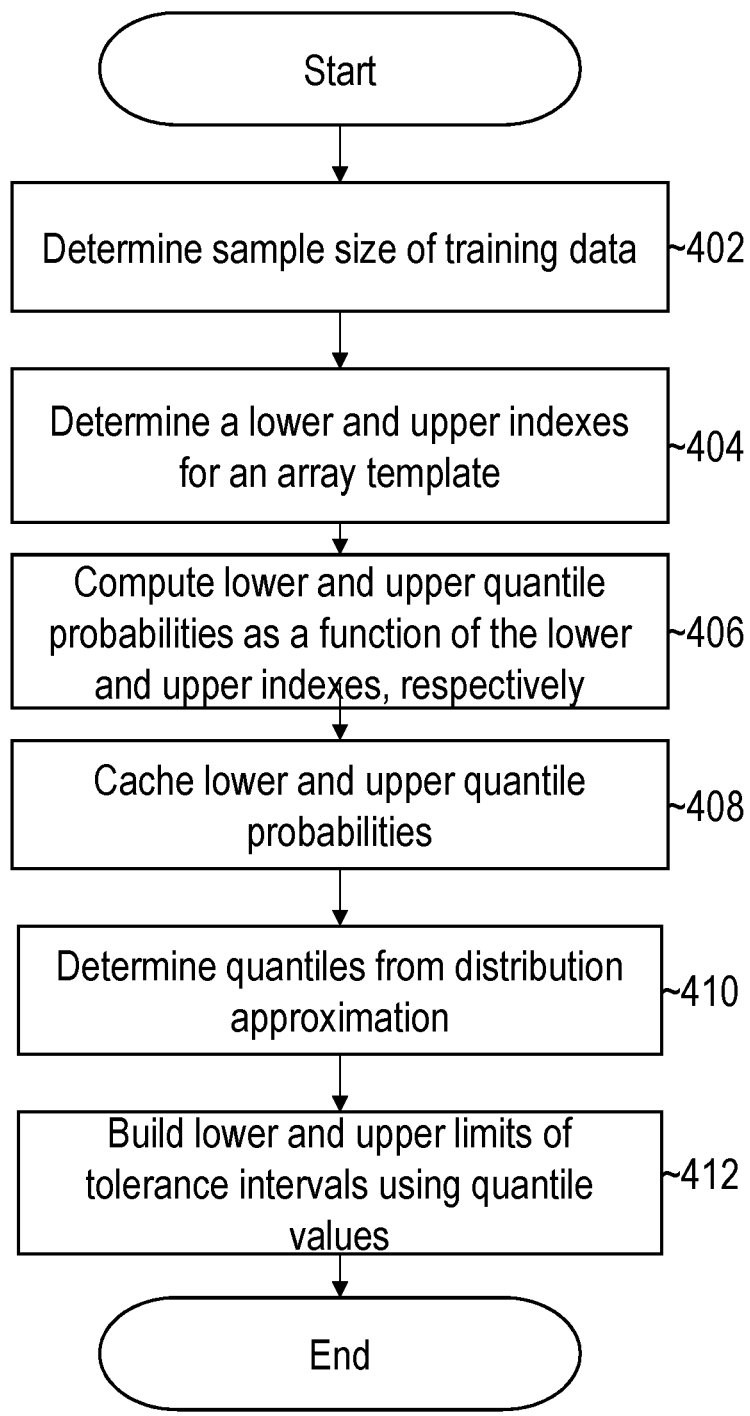
FIG. 4 illustrates an example set of operations for building a tolerance interval for an anomaly detection model in accordance with some embodiments.

FIG. 4 illustrates an example set of operations for building a tolerance interval for an anomaly detection model in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

The process determines the sample size of the training set (operation 402). In streaming implementations, the size may be determined based on the configured window-size and sample rate. For example, a window-size of 1 week with a sample rate of 1-minute intervals would have a size of 10,080 sample values. By comparison, a sample rate of 5-minute intervals would reduce the size to 2,016 sample values. The window-size and sample rate may vary depending on the particular implementation.

The process next determines a lower index and an upper index for an array template (operation 404). In some embodiments, the process uses the Wilks method to determine the PDF and computes the indexes as a function of the PDF as previously described. As previously mentioned, the array template is an abstract array that does not need any actual data to be sorted or persisted. That is the index values may be determined without actually building or storing an array in memory. The process may compute these values as a function of the sample size without the need to know any of the underlying values in the training dataset.

The process next computes the lower and upper quantile probabilities as a function of the lower and upper indexes, respectively (operation 406). The indexes may be converted to quantile probabilities by dividing the value by the number of data points. In the preceding example with 120 data points, for instance, the lower quantile probability may be computed as 3/120=0.025 (2.5$^{th}$ percentile), and the upper quantile probability may be computed as 118/120=0.9833 (98⅓$^{rd}$ percentile).

In some embodiments, the process caches the lower and upper quantile probabilities (operation 408). As previously mentioned, these quantile probabilities do not change when the training dataset size is maintained constant. Therefore, once these values are computed and cached, they may be reused even as new values in the training dataset are received and the underlying distribution of the data changes. It is noted that the runtime cost of computing the intervals per this method has O(1) time complexity, which helps to optimize the computing resources of the system.

The process further determines the quantiles from the t-digest distribution approximation (operation 410). In some embodiments, this operation comprises merging the t-digest structures from different buckets to create an upper-layer t-digest for the entire window. The process may generate the merged t-digest using the process illustrated in FIG. 3A, where the t-digests from each bucket serve as inputs to the process. The total cost of this merge is proportional to sorting all the t-digest centroids. In the example above where there is a maximum number of centroids (e.g., 2×100=2000 centroids total), the operation can be considered O(1).

Once computed, the upper-layer t-digest structure may be used to determine the quantiles of interest. For example, the quantiles approximating the 0.025 and 0.9833 percentiles may be queried in the preceding example. It is noted that the t-digest structures provide relatively accurate approximations at the tail ends of the distribution, which is optimal for anomaly detection systems. A pair of centroids enclosing the requested quantile probability may be determined as follows:

$$p(c_i) = \frac{c_i \cdot \text{count}/2 + \sum_{j<i} c_j \cdot \text{count}}{\sum_j c_j \cdot \text{count}}$$

where the value p represents a fraction of data up to the centroid in question (also referred to as the quantile for the approximate mean of the centroid $c_i$) and is approximated for centroid $c_i$ by summing the weights for all of the centroids in the t-digest structure before $c_i$. The quantiles of interest may then be computed by interpolating between the two centroids. For instance, linear interpolation may be used to compute a sort of weighted averages between centroids $c_i$ and $c_{i-1}$ as follows:

$$lastNum + \frac{(num - lastNum) * (q - lastP)}{p - lastP}$$

where (num, p)=$c_i$ and (lastNum, lastP)=$c_{i-1}$. Here $c_i$ is the first cluster in the t-digest structure satisfying the condition where requested quantile probability q is less than or equal to accumulated probability $p(c_i)$.

The process next builds the lower and upper limits of the anomaly detection model (operation 412). The lower and upper limits may be set to the quantiles returned at operation 410. These values may be updated in real-time as the distribution of data changes based on the input data streams.

Once trained, the lower and upper limits may be used to evaluate incoming data for anomalies, as discussed further below.

4. Unsupervised Monitoring and Anomaly Detection

4.1 Evaluation Process

In some embodiments, anomaly detection services 130 includes logic for monitoring time-series data for anomalies. During monitoring, incoming time-series data may be compared against a trained anomaly detection model to determine whether one or more data points conform to expectations. For example, metrics for a target resource may be compared to the tolerance intervals built according to the techniques previously described. If the time-series dataset under examination does not conform to expected behavior, then one or more responsive actions may be taken to mitigate performance degradation and/or other problems caused by the anomaly.

Figure 5:
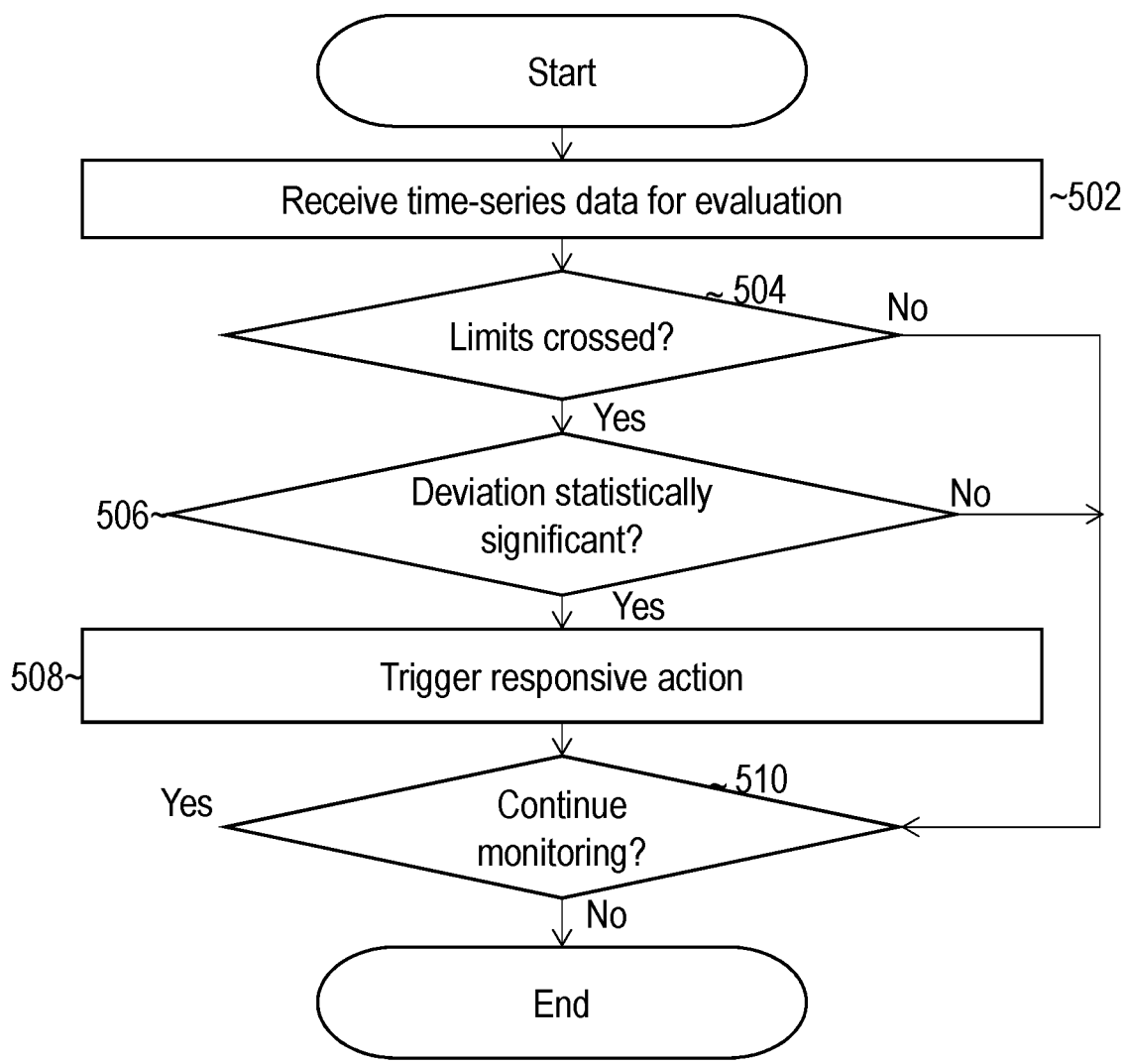
FIG. 5 illustrates an example set of operations for performing anomaly detection using trained models in accordance with some embodiments.

FIG. 5 illustrates an example set of operations for performing anomaly detection using trained models in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

The evaluation process includes receiving time-series data for evaluation (operation 502). The set of time-series data may be provided on-demand, periodically, or on a continuous/streaming basis. For example, anomaly detection services 130 may monitor one or more streams of resource metrics associated with targets 112*a-i*.

In some embodiments, the evaluation process compares one or more data points within the time-series data to the trained upper and lower limits of the tolerance interval to determine whether the limits have been crossed (operation 504). In the context of CPU utilization, for instance, the process may determine whether an evaluation data point is below the lower quantile or above the upper quantile. If the evaluation data point falls outside the conforming range of values that are between the two limits, then the process classifies the evaluation data point as anomalous. Conversely, if the evaluation data point is within the limits, then the evaluation data point is not classified as anomalous.

In some embodiments, if a data point is classified as anomalous, the evaluation process determines whether the deviation is statistically significant (operation 506). The determination of whether a deviation is statistically significant may vary from implementation to implementation. In some cases, a single anomalous data point may be classified as significant and trigger a responsive action. However, in other cases, an evaluation data point may be permitted to cross the limit without automatically triggering an alert. The process may account for the magnitude of the deviation of the evaluation data point, the number of data points in a sequence that have crossed the limits, and/or the cumulative magnitude of deviation for the sequence of data points. One or more of these factors may compared to threshold values. If the thresholds are exceeded, then the deviation may be classified as statistically significant. If the deviation is not statistically significant, then monitoring may continue without triggering a responsive action.

In some embodiments, a cumulative sum (CUSUM) control chart is used to determine whether a deviation is statistically significant. A CUSUM control chart is a model that may be trained to model (a) the expected mean and standard deviation of a time-series signal; (b) the size of a shift from the historical mean and standard deviation; and (c) a control limit or threshold (e.g., five standard deviations) for classifying the time-series as statistically significant. The process may use the CUSUM control chart to track individual and cumulative sums of residual values (e.g., the sums of the negative and positive deviations from the mean). For example, the process may compare the residuals of the time-series signal being evaluated against the residuals of the historical time-series data used to train the anomaly detection model. If a significant shift (e.g., the difference in residuals exceeds the control limit) is detected, then the process may determine that the evaluation data point is not an isolated incident but representative of a change in time-series behavior. In response, the process may classify the deviation as statistically significant.

In some embodiments, if the deviation is determined to be statically significant, then the process triggers a responsive action (operation 508). A responsive action may include, but is not limited to generating an alert, deploying additional resources to satisfy unexpected increases in resource demand (e.g., to service additional client requests), bringing resources offline due to unexpected decreases in demand or to prevent potential compromising behavior (e.g., to prevent denial of service attacks), migrating resources (e.g., moving a production database from one host to another), updating resource configurations (e.g., shifting requests from a resource experiencing unexpected overload to a more available resource), and optimizing a query execution plan (e.g., selecting a plan that exhibits the least amount of anomalies). The responsive action may be performed to mitigate performance degradation in the computing environment caused by the anomalous behavior.

The process further includes determining whether to continue monitoring the time-series data (operation 510). Monitoring may be stopped at any point on demand, based on predefined time limits, or based on any other criteria. The process may stream or periodically receive time-series data generated by targets 112*a-i* for evaluation. The process may be repeated for remaining data points in the received time-series dataset and/or as new time-series data is received to continue evaluating resource behavior within the computing environment.

4.2 Example Applications

The anomaly detection system described above may be integrated into a variety of application. Examples include, but are not limited to, microservice applications, cloud services, enterprise applications, and mobile applications. The anomaly detection system may be used to monitor the behavior of various types of resources such as software and/or hardware resources across one or more tiers of a multi-tier application. The responsive actions that are taken may vary depending on the resource on which the anomalous behavior is detected.

In some embodiments, the anomaly detection system may be integrated with a database management system to detect anomalous query behavior. For example, the anomaly detection system may use the non-parametric tolerance intervals to monitor query execution times, database response times, and/or other metrics. Queries that are exhibiting anomalous behavior may be flagged and brought to the attention of a database administrator.

In some embodiments, the anomaly detection system may monitor performance metrics of different query execution plans for a given database query. Within a given period of time (e.g., an hour, a day, week, month, etc.), the anomaly detection system may generate a summary that identifies the number and/or frequency of anomalies for each execution plan. The summary may be used by the database management system to automatically select a query execution plan. For example, the database management system may select a plan that is least likely to exhibit anomalous behavior or the most performant plan where the number of anomalies is less than a threshold value. Additionally or alternatively, corrective action may be taken to correct execution plans, such to fix priority one (P1) bugs.

Additionally or alternatively, the anomaly detection system may be integrated into other resources to isolate anomalous behavior and take appropriate corrective action. For example, the anomaly detect system may be applied to middleware instances, web servers, load balancers, etc. The non-parametric tolerance intervals may be trained based on data streams tracking metrics for one or more such resources.

In some embodiments, if a resource is exhibiting anomalous behavior anomaly detection services 130 invokes one or more APIs to restart the resource, migrate the resource, bring additional resources online, or otherwise configure resources to mitigate the impact of the resource on the performance of a multi-tier application. For instance, if a database (or any other resource) is exhibiting anomalous behavior, a backup resource may be brought online and requests may be redirected to the backup resource until the issue is resolved. Additionally or alternatively, the affected database may be restarted and/or a patch may be applied in an attempt to resolve any issues.

In some embodiments, anomaly detection services 130 includes an interface, such as a GUI, CLI, and/or API, for presenting and responding to detected anomalies. For example, a GUI interface may present an interactive visualization to a user upon detecting an anomaly. The interactive visualization may include a graph of time-series data that displays information about the detected anomalies. Example information may include, but is not limited, the time the anomaly was first detected, the magnitude and duration of the anomaly, and information (e.g. hostnames, IP addresses, resource type) about the target or set of targets which triggered the alert.

Additionally or alternatively, an interactive visualization may highlight a temporal region on a graph where the anomaly occurred. For example, if a time-series signal crosses an upper or lower limit of the baseline on Monday, from 2:00-4:00 p.m., this temporal region of the graph may be highlighted in red or another distinguishing color to allow the user to more easily identify the duration and magnitude of the deviation.

Additionally or alternatively, an interactive visualization may allow a user to click or otherwise select temporal regions of a graph to view more details about an anomaly. For example, responsive to an anomaly being detected, an initial chart may be displayed with a temporal region being highlighted where an anomaly was detected. Additional details about the anomaly may be stored in data repository 140 without being initially displayed. Responsive to clicking on the temporal region, the system may access the additional details from data repository 140 and display them to the end user. The additional details may give more specifics about the cause of the anomaly. For instance, if CPU utilization on a target host crosses an upper limit, additional details about the demands (e.g., the number of executions, transactions, user calls, etc.) on the target host may be presented.

Additionally or alternatively, an interactive visualization may visually depict tolerance interval parameters. For example, the tolerance interval may be overlaid on a histogram chart or a graph of time-series values. Additionally or alternatively, the visualization may depict limits corresponding to different values of p and/or β. For example, the visualization may depict the upper and lower limit values for 90% coverage at varying confidence levels (e.g., 50%, 75%, 90%, etc.) The visualization may help a user determine which parameters are optimal for a given application. The user may click on or otherwise select the values for p and/or β that are presented through the interface. The currently selected upper and lower limit values used for anomaly detection may be presented in a different color or otherwise visually highlighted to differentiate from the other available options.

Additionally or alternatively, an interactive visualization may allow a user to perform one or more responsive actions when an anomaly is detected. For example, a user may shut down a host, throttle requests, or perform any of the other responsive actions previously described. The interactive visualization may thus help users quickly identify and respond to problematic resource behavior within a cloud or other computing environment.

5.0. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the micro services manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates computer system 600 upon which one or more embodiments may be implemented. Computer system 600 includes bus 602 or other communication mechanism for communicating information, and hardware processor 604 coupled with bus 602 for processing information. Hardware processor 604 may be, for example, a general purpose microprocessor.

Computer system 600 also includes main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes read only memory (ROM) 608 or other static storage device coupled to bus 602 for storing static information and instructions for processor 604. Storage device 610, such as a magnetic disk or optical disk, is provided and coupled to bus 602 for storing information and instructions.

Computer system 600 may be coupled via bus 602 to display 612, such as a cathode ray tube (CRT), liquid crystal display (LCD), or light-emitting diode (LED), for displaying information to a computer user. Input device 614, which may include physical and/or touchscreen based alphanumeric keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to host computer 624 or to data equipment operated by Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, server 630 might transmit a requested code for an application program through Internet 628, ISP 626, local network 622 and communication interface 618.

The received code may be executed by processor 604 as it is received, and/or stored in storage device 610, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating an approximation of a data distribution for a training dataset, wherein the training dataset includes varying values for a particular metric associated with at least one computing resource;
training, by one or more machine learning processes based at least in part on the approximation of the data distribution for the training dataset, an anomaly detection model, wherein training the anomaly detection model includes:
determining, based on a size of the training dataset, a first quantile probability and a second quantile probability that represent an interval for covering a prescribed proportion of values for the particular metric within a prescribed confidence level;
updating a lower limit of the anomaly detection model using a first quantile that represents the first quantile probability in the approximation of the data distribution; and
updating an upper limit of the anomaly detection model using a second quantile that represents the second quantile probability in the approximation of the data distribution;
evaluating, using the trained anomaly detection model, a set of input data for the particular metric using the lower limit and the upper limit of the anomaly detection model to determine whether a particular computing resource is exhibiting anomalous behavior; and
triggering one or more responsive actions directed to addressing the anomalous behavior of the particular computing resource responsive, at least in part, to determining that the particular computing resource is exhibiting anomalous behavior.

2. The method of claim 1, wherein the one or more responsive actions include triggering, by a network service, an alert to notify a user of the network service that the particular computing resource is exhibiting anomalous behavior, wherein the alert identifies data points in the set of input data that have exceeded the upper limit or fall below the lower limit.

3. The method of claim 1, wherein the one or more responsive actions include selecting and executing a query execution plan for a particular query that causes less anomalous behavior than other query execution plans for the particular query.

4. The method of claim 1,
wherein determining the first quantile probability comprises:
identifying a first index for a hypothetical sorted array matching the size of the training dataset;
and dividing the first index by the size of the training dataset;
wherein determining the second quantile probability comprises:
identifying a second index fora hypothetical sorted array matching the size of the training dataset; and
dividing the second index by the size of the training dataset.

5. The method of claim 1, further comprising: updating the approximation of the data distribution as new training data is received using a sliding window of t-digest structures; wherein updating the approximation of the data distribution comprises removing an oldest t-digest structure and adding a new t-digest structure; updating the lower limit and the upper limit using new quantiles that represent the first quantile probability and the second quantile probability in the updated approximation of the data distribution.

6. The method of claim 1, wherein the first quantile probability and the second quantile probability are not computed as a function of the varying values for the particular metric.

7. The method of claim 1, wherein at least a portion of the data points from the training dataset are not persisted in volatile or non-volatile storage while training the anomaly detection model.

8. The method of claim 1, wherein the one or more responsive actions comprise deploying one or more additional computing resources to satisfy unexpected increases in demand or bringing one or more resources offline based at least in part on the anomalous behavior of the computing resource.

9. The method of claim 1, wherein the one or more responsive actions comprise updating at least one configuration of at least one of the particular computing resource or another computing resource based at least in part on the anomalous behavior of the particular computing resource.

10. One or more non-transitory computer-readable media storing instructions, which, when executed by one or more hardware processors, cause:
generating an approximation of a data distribution for a training dataset, wherein the training dataset includes varying values for a particular metric associated with at least one computing resource;
training, by one or more machine learning processes based at least in part on the approximation of the data distribution for the training dataset, an anomaly detection model, wherein training the anomaly detection model includes:
determining, based on a size of the training dataset, a first quantile probability and a second quantile probability that represent an interval for covering a prescribed proportion of values for the particular metric within a prescribed confidence level;
updating a lower limit of the anomaly detection model using a first quantile that represents the first quantile probability in the approximation of the data distribution; and updating an upper limit of the anomaly detection model using a second quantile that represents the second quantile probability in the approximation of the data distribution;

evaluating, using the trained anomaly detection model, a set of input data for the particular metric using the lower limit and the upper limit of the anomaly detection model to determine whether a particular computing resource is exhibiting anomalous behavior; and triggering one or more responsive actions directed to addressing the anomalous behavior of the particular computing resource responsive, at least in part, to determining that the particular computing resource is exhibiting anomalous behavior.

11. The one or more non-transitory computer-readable media of claim 10, wherein the one or more responsive actions include triggering, by a network service, an alert to notify a user of the network service that the particular computing resource is exhibiting anomalous behavior, wherein the alert identifies data points in the set of input data that have exceeded the upper limit or fall below the lower limit.

12. The one or more non-transitory computer-readable media of claim 10, wherein the one or more responsive actions include selecting and executing a query execution plan for a particular query that causes less anomalous behavior than other query execution plans for the particular query.

13. The one or more non-transitory computer-readable media of claim 10,
wherein determining the first quantile probability comprises:
identifying a first index for a hypothetical sorted array matching the size of the training dataset;
and dividing the first index by the size of the training dataset;
wherein determining the second quantile probability comprises:
identifying a second index fora hypothetical sorted array matching the size of the training dataset; and
dividing the second index by the size of the training dataset.

14. The one or more non-transitory computer-readable media of claim 10, the instructions further causing: updating the approximation of the data distribution as new training data is received using a sliding window of t-digest structures; wherein updating the approximation of the data distribution comprises removing an oldest t-digest structure and adding a new t-digest structure; updating the lower limit and the upper limit using new quantiles that represent the first quantile probability and the second quantile probability in the updated approximation of the data distribution.

15. The one or more non-transitory computer-readable media of claim 10, wherein the first quantile probability and the second quantile probability are not computed as a function of the varying values for the particular metric.

16. The one or more non-transitory computer-readable media of claim 10, wherein at least a portion of the data points from the training dataset are not persisted in volatile or non-volatile storage while training the anomaly detection model.

17. A system comprising:
one or more hardware processors;
one or more non-transitory computer-readable media storing instructions, which, when executed by the one or more hardware processors, cause:
generating an approximation of a data distribution for a training dataset, wherein the training dataset includes varying values for a particular metric associated with at least one computing resource;
training, by one or more machine learning processes based at least in part on the approximation of the data distribution for the training dataset, an anomaly detection model, wherein training the anomaly detection model includes:
determining, based on a size of the training dataset, a first quantile probability and a second quantile probability that represent an interval for covering a prescribed proportion of values for the particular metric within a prescribed confidence level;
updating a lower limit of the anomaly detection model using a first quantile that represents the first quantile probability in the approximation of the data distribution; and
updating an upper limit of the anomaly detection model using a second quantile that represents the second quantile probability in the approximation of the data distribution;
evaluating, using the trained anomaly detection model, a set of input data for the particular metric using the lower limit and the upper limit of the anomaly detection model to determine whether a particular computing resource is exhibiting anomalous behavior; and
triggering one or more responsive actions directed to addressing the anomalous behavior of the particular computing resource responsive, at least in part, to determining that the particular computing resource is exhibiting anomalous behavior.

18. The system of claim 17, wherein the one or more responsive actions include triggering, by a network service, an alert to notify a user of the network service that the particular computing resource is exhibiting anomalous behavior, wherein the alert identifies data points in the set of input data that have exceeded the upper limit or fall below the lower limit.

19. The system of claim 17, wherein the one or more responsive actions include selecting and executing a query execution plan for a particular query that causes less anomalous behavior than other query execution plans for the particular query.

20. The system of claim 17,
wherein determining the first quantile probability comprises:
identifying a first index for a hypothetical sorted array matching the size of the training dataset;
and dividing the first index by the size of the training dataset;
wherein determining the second quantile probability comprises:
identifying a second index fora hypothetical sorted array matching the size of the training dataset; and
dividing the second index by the size of the training dataset.

* * * * *

UNITED STATES PATENT AND TRADEMARK OFFICE
CERTIFICATE OF CORRECTION

PATENT NO. : 11,537,940 B2
APPLICATION NO. : 16/410980
DATED : December 27, 2022
INVENTOR(S) : BahenaTapia et al.

It is certified that error appears in the above-identified patent and that said Letters Patent is hereby corrected as shown below:

On the Title Page

Item (12) delete "BahenaTapia" and insert -- Bahena Tapia --, therefor.

Column 1, Item (72) under Inventors, Line 1, delete "BahenaTapia" and insert -- Bahena Tapia --, therefor.

On page 3, Column 1, under Other Publications, Line 6, delete "(Year" and insert -- (Year: --, therefor.

On page 3, Column 2, under Other Publications, Line 16, delete "ITI2011" and insert -- ITI 2011 --, therefor.

On page 3, Column 2, under Other Publications, Line 29, delete "Slipe Iskyy," and insert -- Slipetskyy, --, therefor.

In the Specification

In Column 1, Line 26, delete "contents" and insert -- contents. --, therefor.

In Column 8, Line 13, delete "$\{\alpha_1, \alpha_2, \ldots \alpha k\}$" and insert -- $\{a_1, a_2, \ldots ak\}$ --, therefor.

In Column 10, Line 67, delete "points." and insert -- points --, therefor.

In Column 22, Line 22, delete "micro services." and insert -- microservices. --, therefor.

In Column 22, Line 43, delete "micro services" and insert -- microservices --, therefor.

In the Claims

Signed and Sealed this
Tenth Day of September, 2024

Katherine Kelly Vidal
*Director of the United States Patent and Trademark Office*

In Column 26, Line 13, in Claim 4, delete "fora" and insert -- for a --, therefor.

In Column 27, Line 41, in Claim 13, delete "fora" and insert -- for a --, therefor.

In Column 28, Line 58, in Claim 20, delete "fora" and insert -- for a --, therefor.